United States Patent
Lee et al.

(10) Patent No.: US 12,179,769 B2
(45) Date of Patent: Dec. 31, 2024

(54) DRIVING APPARATUS AND DRIVING CONTROL METHOD

(71) Applicant: HANWHA AEROSPACE CO., LTD., Changwon-si (KR)

(72) Inventors: Eun Young Lee, Changwon-si (KR); Chul Hee Han, Changwon-si (KR)

(73) Assignee: HANWHA AEROSPACE CO., LTD., Changwon-si (KR)

( * ) Notice: Subject to any disclaimer, the term of this patent is extended or adjusted under 35 U.S.C. 154(b) by 225 days.

(21) Appl. No.: 17/873,902

(22) Filed: Jul. 26, 2022

(65) Prior Publication Data

US 2023/0242122 A1 Aug. 3, 2023

(30) Foreign Application Priority Data

Feb. 3, 2022 (KR) .................. 10-2022-0014019

(51) Int. Cl.
*B60W 40/064* (2012.01)
*G01C 21/00* (2006.01)

(52) U.S. Cl.
CPC ....... *B60W 40/064* (2013.01); *G01C 21/3815* (2020.08); *B60W 2552/20* (2020.02); *B60W 2555/20* (2020.02)

(58) Field of Classification Search
CPC ......... B60W 2520/06; B60W 2520/10; B60W 2552/20; B60W 2555/20; B60W 30/08; B60W 30/12; B60W 30/182; B60W 40/06; B60W 40/064; B60W 40/105; G01C 21/3815
See application file for complete search history.

(56) References Cited

U.S. PATENT DOCUMENTS

| | | | |
|---|---|---|---|
| 10,967,876 B2 * | 4/2021 | Asakura | B60W 50/02 |
| 11,220,270 B2 * | 1/2022 | Tsuji | B60W 40/08 |
| 2020/0086877 A1 * | 3/2020 | Zhang | B60W 50/038 |
| 2020/0269758 A1 * | 8/2020 | Yu | B60W 50/14 |
| 2020/0269857 A1 * | 8/2020 | Tsuji | B60W 40/08 |
| 2021/0048529 A1 * | 2/2021 | Roy Chowdhury | B60W 40/068 |
| 2021/0123526 A1 * | 4/2021 | Inoue | F16H 59/44 |

(Continued)

FOREIGN PATENT DOCUMENTS

| CN | 116353610 A | * | 6/2023 |
|---|---|---|---|
| JP | 2005-106728 A | | 4/2005 |

(Continued)

*Primary Examiner* — Babar Sarwar
(74) *Attorney, Agent, or Firm* — Sughrue Mion, PLLC

(57) ABSTRACT

A driving apparatus and a driving control method is provided. The driving apparatus includes vehicle body; a plurality of vehicle propulsion bodies connected to the vehicle body and configured to enable the vehicle body to travel; at least one sensor configured to sense surroundings of the vehicle body; and a controller configured to control the vehicle body to travel by referring to at least one sensing result of the at least one sensor, wherein the at least one sensor includes a vision generation sensor configured to generate vision information regarding a travel route of the vehicle body and wherein the controller is further configured to determine a road surface condition of the travel route by referring to the vision information, and adjust a difference in driving speed between the plurality of vehicle propulsion bodies according to the road surface condition.

18 Claims, 11 Drawing Sheets

(56) References Cited

U.S. PATENT DOCUMENTS

| | | | |
|---|---|---|---|
| 2021/0300364 A1* | 9/2021 | Sadamura | B60W 30/12 |
| 2022/0144271 A1* | 5/2022 | Yang | G06V 20/56 |
| 2022/0355823 A1* | 11/2022 | Tagawa | G08G 1/0141 |
| 2022/0388545 A1* | 12/2022 | Chae | B60W 60/0015 |
| 2023/0311951 A1* | 10/2023 | Kobayashi | B60S 1/0818 |
| | | | 701/23 |
| 2023/0358559 A1* | 11/2023 | Iihoshi | G01C 21/3885 |
| 2024/0046779 A1* | 2/2024 | Sugawara | B60W 50/14 |

FOREIGN PATENT DOCUMENTS

| | | |
|---|---|---|
| JP | 2017-138132 A | 8/2017 |
| KR | 10-2343020 B1 | 12/2021 |

* cited by examiner

DRIVING APPARATUS AND DRIVING CONTROL METHOD

CROSS-REFERENCE TO RELATED APPLICATION

This application claims priority from Korean Patent Application No. 10-2022-0014019 filed on Feb. 3, 2022, in the Korean Intellectual Property Office, and all the benefits accruing therefrom under 35 U.S.C. 119, the contents of which in its entirety are herein incorporated by reference.

BACKGROUND

1. Field

Embodiments of the present disclosure relate to a driving apparatus and a driving control method, and more particularly, to a driving apparatus and a driving control method which reset a driving mode and a travel route according to a road surface condition.

2. Description of the Related Art

Unmanned autonomous vehicles move in various areas and conduct an operation. For autonomous driving, the unmanned autonomous vehicles may be provided with a means for sensing the surroundings and may move along a route available for driving while avoiding obstacles based on the sensing result.

The means for sensing the surroundings may include a light detection and ranging (LIDAR), and anti-shake technology may be applied to improve the quality of the sensing result.

Meanwhile, existing unmanned autonomous vehicles may have accumulated damage from the road surface conditions since they travel in consideration of only obstacles present on the route. For example, when an unmanned autonomous vehicles travel in a state where objects, such as small stones or gravel, are present on the road surface along a travel route, equipment mounted in the unmanned autonomous vehicle or the unmanned autonomous vehicle itself may be damaged.

Therefore, there is a need for a system for resetting a driving condition by taking into account the road surface conditions.

SUMMARY

Aspects of the present disclosure provide a driving apparatus and a driving control method.

According to embodiments of the present disclosure, a driving apparatus is provided. The driving apparatus includes: a vehicle body; a plurality of vehicle propulsion bodies connected to the vehicle body and configured to enable the vehicle body to travel; at least one sensor configured to sense surroundings of the vehicle body; and a controller configured to control the vehicle body to travel by referring to at least one sensing result of the at least one sensor, wherein the at least one sensor includes a vision generation sensor configured to generate vision information regarding a travel route of the vehicle body and wherein the controller is further configured to determine a road surface condition of the travel route by referring to the vision information, and adjust a difference in driving speed between the plurality of vehicle propulsion bodies according to the road surface condition.

According to one or more embodiments of the present disclosure, the controller is configured to determine the road surface condition of the travel route by referring to at least one from among vibration of the vehicle body and ambient sound generated around the vehicle body.

According to one or more embodiments of the present disclosure, the controller is further configured to determine the road surface condition of the travel route by referring to a slip rate that is a difference between a controlled driving direction of the vehicle body and an actual driving direction of the vehicle body.

According to one or more embodiments of the present disclosure, the controller is further configured to determine the road surface condition of the travel route by referring to at least one from among weather and time during travel of the vehicle body.

According to one or more embodiments of the present disclosure, the controller is further configured to determine the road surface condition of the travel route by referring to prior travel information.

According to one or more embodiments of the present disclosure, the controller is further configured to update the prior travel information through learning, and determine the road surface condition of the travel route by referring to the updated prior travel information.

According to one or more embodiments of the present disclosure, the controller is further configured to determine a driving mode of the vehicle body according to the road surface condition of the travel route, wherein the controller is configured to determine the driving mode as: a first driving mode based on a difficulty in overcoming a travel-obstruction element present on the travel route being less than a preset first threshold; a second driving mode based on the difficulty in overcoming the travel-obstruction element present on the travel route being greater than or equal to the preset first threshold and less than a preset second threshold; and a third driving mode based on the difficulty in overcoming the travel-obstruction element present on the travel route being greater than or equal to the preset second threshold.

According to one or more embodiments of the present disclosure, the controller is further configured to: based on the driving mode being determined to be the first driving mode or the third driving mode, control driving speeds of the plurality of vehicle propulsion bodies to be individually set, and based on the driving mode being determined to be the second driving mode, control the driving speeds of the plurality of vehicle propulsion bodies to be set the same as each other.

According to one or more embodiments of the present disclosure, the controller is further configured to: based on the driving mode being determined to be the first driving mode or the second driving mode, control the vehicle body to travel to overcome the travel-obstruction element; and based on the driving mode being determined to be the third driving mode, control the vehicle body to travel to avoid the travel-obstruction element.

According to one or more embodiments of the present disclosure, the controller is further configured to: based on the driving mode being determined to be the second driving mode and a preset condition for remaining on a route being satisfied, control the vehicle body to travel to overcome a travel-obstruction element; and based on the driving mode being determined to be the third driving mode and the preset condition for remaining on the route being satisfied, control the vehicle body to travel to overcome the travel-obstruction element, instead of avoiding the travel-obstruction element.

According to embodiments of the present disclosure, a driving control method of controlling a driving apparatus to travel is provided. The driving control method is performed by at least one processor and includes: obtaining, at least one sensing result by sensing, with at least one sensor, surroundings of a vehicle body of the driving apparatus; and controlling the vehicle body to travel by referring to the at least one sensing result, wherein the sensing of the surroundings of the vehicle body includes generating vision information regarding a travel route of the vehicle body, and wherein the controlling of the vehicle body to travel includes determining a road surface condition of the travel route by referring to the vision information, and adjusting a difference in driving speed between a plurality of vehicle propulsion bodies, of the driving apparatus, according to the road surface condition.

According to one or more embodiments of the present disclosure, the determining includes determining the road surface condition of the travel route by referring to at least one from among vibration of the vehicle body and ambient sound generated around the vehicle body.

According to one or more embodiments of the present disclosure, the determining includes determining the road surface condition of the travel route by referring to a slip rate that is a difference between a controlled driving direction of the vehicle body and an actual driving direction of the vehicle body.

According to one or more embodiments of the present disclosure, the determining includes determining the road surface condition of the travel route by referring to at least one from among weather and time during travel of the vehicle body.

According to one or more embodiments of the present disclosure, the determining includes determining the road surface condition of the travel route by referring to prior travel information.

According to one or more embodiments of the present disclosure, the controlling of the vehicle body to travel further includes updating the prior travel information through learning, and wherein the determining includes determining the road surface condition of the travel route by referring to the updated prior travel information.

According to one or more embodiments of the present disclosure, the controlling of the vehicle body to travel further includes determining a driving mode of the vehicle body according to the road surface condition of the travel route, wherein the driving mode is determined as: a first driving mode based on a difficulty in overcoming a travel-obstruction element present on the travel route being less than a preset first threshold; a second driving mode based on the difficulty in overcoming the travel-obstruction element present on the travel route being greater than or equal to the preset first threshold and less than a preset second threshold; or a third driving mode based on the difficulty in overcoming the travel-obstruction element present on the travel route being greater than or equal to the preset second threshold.

According to one or more embodiments of the present disclosure, the controlling of the vehicle body to travel further includes: based on the driving mode being determined to be the first driving mode or the third driving mode, controlling driving speeds of the plurality of vehicle propulsion bodies to be individually set; or based on the driving mode being determined to be the second driving mode, controlling the driving speeds of the plurality of vehicle propulsion bodies to be set the same as each other.

According to one or more embodiments of the present disclosure, the controlling of the vehicle body to travel further includes: based on the driving mode being determined to be the first driving mode or the second driving mode, controlling the vehicle body to travel to overcome a travel-obstruction element; or based on the driving mode being determined to be the third driving mode, controlling the vehicle body to travel to avoid the travel-obstruction element.

According to one or more embodiments of the present disclosure, the controlling of the vehicle body to travel further includes: based on the driving mode being determined to be the second driving mode and a preset condition for remaining on a route is satisfied, controlling the vehicle body to travel to overcome the travel-obstruction element; or based on the driving mode being determined to be the third driving mode and the preset condition for remaining on the route is satisfied, controlling the vehicle body to travel to overcome the travel-obstruction element, instead of avoiding the travel-obstruction element.

However, aspects of the present disclosure are not restricted to those set forth herein. The above and other aspects of the present disclosure will become more apparent to one of ordinary skill in the art to which the present disclosure pertains by referencing the detailed description of the present disclosure given below.

It should be noted that effects of embodiments of the present disclosure are not limited to those described above, and other effects of embodiments of the present disclosure will be apparent from the following description.

BRIEF DESCRIPTION OF DRAWINGS

The above and other aspects and features of the present disclosure will become more apparent by describing in detail non-limiting example embodiments thereof with reference to the attached drawings, in which.

DETAILED DESCRIPTION

Figure 1:
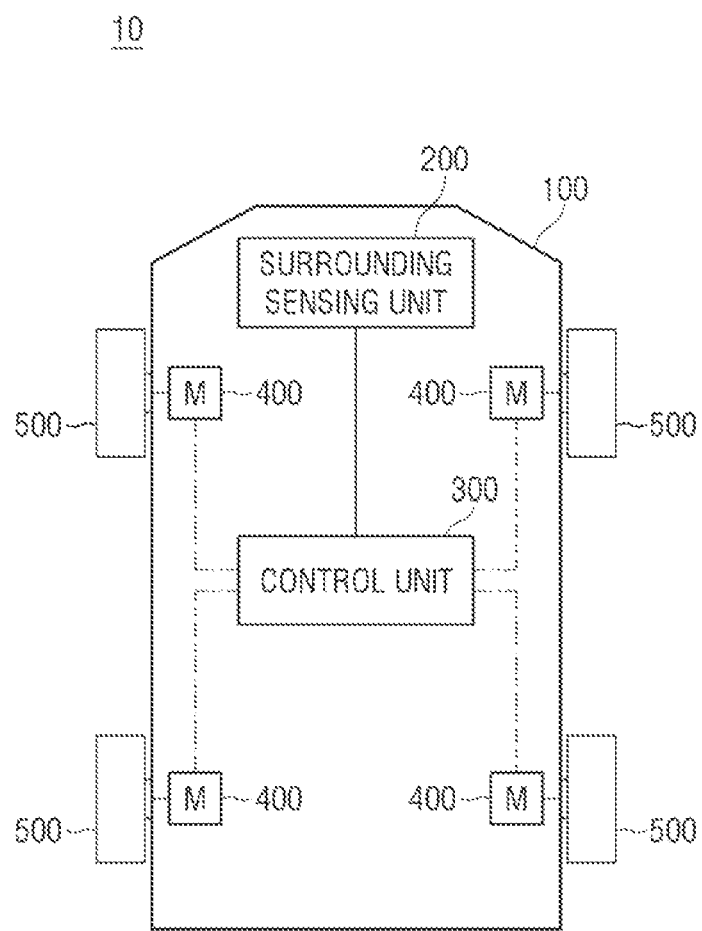
FIG. 1 is a diagram illustrating a driving apparatus according to an embodiment of the present disclosure.
Figure 2:
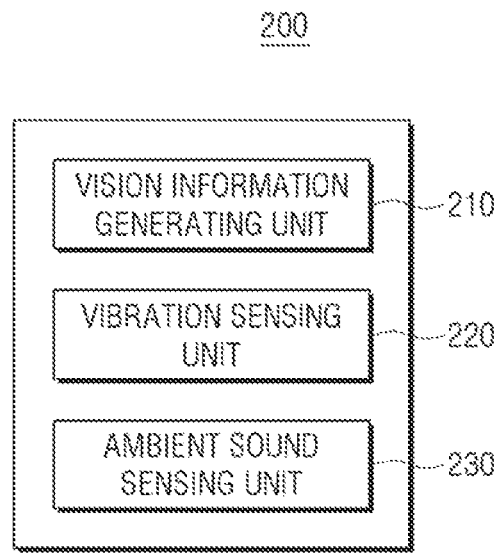
FIG. 2 is a block diagram illustrating a surrounding sensing unit shown in FIG. 1.

FIG. 1 is a diagram illustrating a driving apparatus according to an embodiment of the present disclosure, and FIG. 2 is a block diagram illustrating a surrounding sensing unit shown in FIG. 1.

Referring to FIG. 1, a driving apparatus 10 according to an embodiment of the present disclosure includes a body 100, a surrounding sensing unit 200 (also referred to as "at least one sensor"), a control unit 300 (also referred to as a "controller"), a driving unit 400 (also referred to as a "vehicle propulsion driver"), and a travel driving unit 500 (also referred to as a "vehicle propulsion body").

The body 100 may form an exterior of the driving apparatus 10. The surrounding sensing unit 200, the control unit 300, the driving unit 400, and the travel driving unit 500 may be provided inside or outside of the body 100.

The surrounding sensing unit 200 may sense the surroundings of the body 100. In particular, the surrounding sensing unit 200 may sense a driving direction of the driving apparatus 10.

Referring to FIG. 2, the surrounding sensing unit 200 includes a vision information generating unit 210 (also referred to as a "vision generation sensor"), a vibration sensing unit 220 (also referred to as a "vibration sensor"), and an ambient sound sensing unit 230 (also referred to as a "sound sensor").

The vision information generating unit 210 may generate vision information regarding a travel route of the body 100. In embodiments of the present disclosure, the vision information may be information that visually expresses the surroundings of the body 100. For example, the vision information generating unit 210 may include at least one from among a light detection and ranging (LIDAR) sensor, a radio detection and ranging (RADAR) sensor, a visible light camera, and an infrared camera.

The LIDAR sensor may emit light to the surroundings and receive light reflected by objects. A three-dimensional map of the surroundings and travel route of the body 100 may be generated based on the received light. Objects present around the body 100 and on the travel route may be detected using the three-dimensional map generated by means of the LIDAR sensor.

The RADAR sensor may emit electromagnetic waves to the surroundings and receive reflection waves reflected by objects. A three-dimensional map of the surroundings and travel route of the body 100 may be generated based on the received reflection waves. Objects present around the body 100 and on the travel route may be detected using the three-dimensional map generated by means of the RADAR sensor. The visible light camera or the infrared camera may photograph the surroundings and travel route of the body 100 to generate a visible light image or an infrared image. The image generated by the visible light camera or the infrared camera may be a still image or a moving image.

The vibration sensing unit 220 may sense vibration of the body 100. Specifically, the vibration sensing unit 220 may sense vibration of the body 100 while the driving apparatus 10 travels along the travel route. In order to sense the vibration of the body 100, the vibration sensing unit 220 may include at least one of a gravity sensor, an acceleration sensor, or a gyro sensor.

The ambient sound sensing unit 230 may sense ambient sound generated around the body 100. Specifically, the ambient sound sensing unit 230 may sense ambient sound generated around the body 100 while the driving apparatus 10 travels along the travel route. In particular, the ambient sound sensing unit 230 may sense ambient sound generated near the travel driving unit 500. To this end, the ambient sound sensing unit 230 may be disposed in vicinity of the travel driving unit 500.

Referring back to FIG. 1, the control unit 300 may control the body 100 to travel by referring to the sensing result of the surrounding sensing unit 200. For example, the control unit 300 may control the body 100 to continue to travel, stop traveling, or avoid an obstacle by referring to the sensing result of the surrounding sensing unit 200.

As described above, when the vision information generating unit 210 includes the LIDAR sensor or the RADAR sensor, the three-dimensional map of the surroundings of the body 100 may be generated. The control unit 300 may control the body 100 to travel to avoid the obstacle on the travel route with reference to the three-dimensional map.

In particular, the control unit 300 may determine a road surface condition of the travel route by referring to the vision information generated by the vision information generating unit 210 and adjust a difference in driving speed between a plurality of the travel driving unit 500 according to the road surface condition. To this end, the control unit 300 may determine a driving mode of the body 100 according to the road surface condition of the travel route. In addition, the control unit 300 may control the body 100 to travel in the determined driving mode.

Travel-obstruction elements that obstruct the traveling of the body 100 may be present on the travel route. The travel-obstruction elements may include at least one from among gravel, stones, tree branches, puddles, water, snow, and ice. When the body 100 maintains a constant speed along the travel route on which travel-obstruction elements, such as gravel, stones, tree branches, or puddles, are present, an excessively large impact is applied to the body 100 so that the body 100 may be damaged or the equipment loaded inside or outside the body 100 may be damaged. When the body 100 maintains a constant speed along the travel route on which a travel-obstruction element, such as water, snow, or ice, is present, the body 100 may slide on the ground, thereby colliding with nearby objects or deviating from the route.

As the control unit 300 controls the body 100 to travel by referring to the vision information generated by the vision information generating unit 210, damage caused by the travel obstruction factors may be prevented or minimized.

The control unit 300 may determine the road surface condition of the travel route with reference to at least one from among vibration and ambient sound, in addition to the vision information generated by the vision information generating unit 210. Here, the vibration may be vibration of the body 100 sensed by the vibration sensing unit 220, and the ambient sound may be an ambient sound generated around the body 100 sensed by the ambient sound sensing unit 230. The operation of the control unit 300 will be described in detail below with reference to FIG. 3.

The travel driving unit 500 may be provided in the body 100 and enable the body 100 to travel. The travel driving unit 500 may be provided in plural. The plurality of the travel driving unit 500 may be disposed at different positions of the body 100. For example, the plurality of the travel driving unit 500 may be provided at the front-left side, the front-right side, the rear-left side, and the rear-right side of the body 100, respectively. Each of the plurality of the travel driving unit 500 may have the same size and shape. The plurality of the travel driving unit 500 may be provided in the form of wheels or tracks. For example, the driving apparatus 10 according to an embodiment of the present disclosure may be provided in the form of a vehicle.

The driving unit 400 may generate a driving force for the body 100 to travel. For example, the driving unit 400 may be provided in the form of a motor that generates a driving force with supplied power. The driving force of the driving unit 400 may be transferred to the travel driving unit 500, and the body 100 may travel by the operation of the travel driving unit 500.

The driving unit 400 may be provided in plural, like the travel driving unit 500. Specifically, the driving unit 400 may be provided for each of the plurality of the travel driving unit 500. Each driving unit 400 may generate the driving force to operate the travel driving unit 500 connected thereto.

Figure 3:
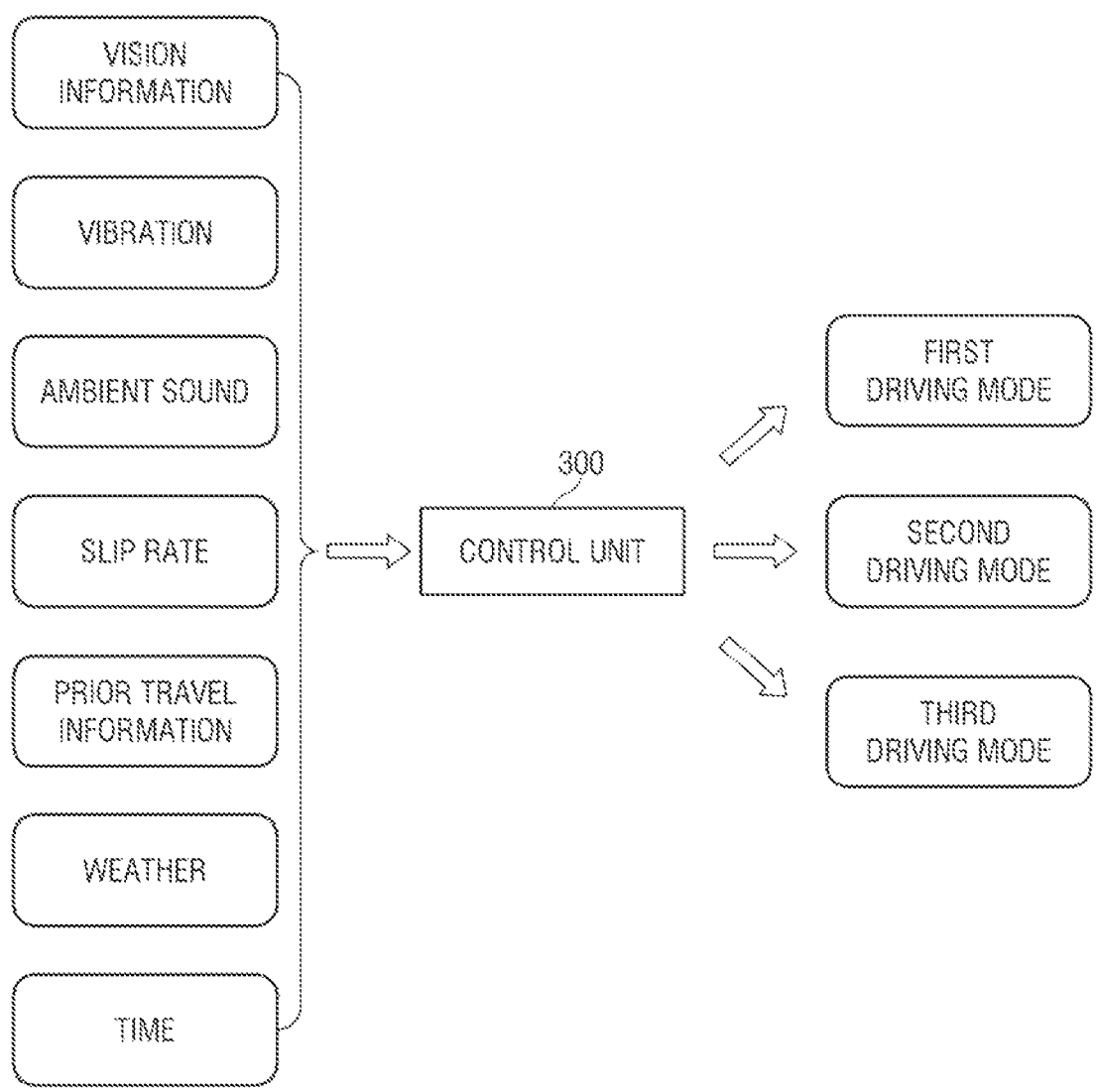
FIG. 3 is a diagram for explaining the operation of the control unit.
Figure 4:
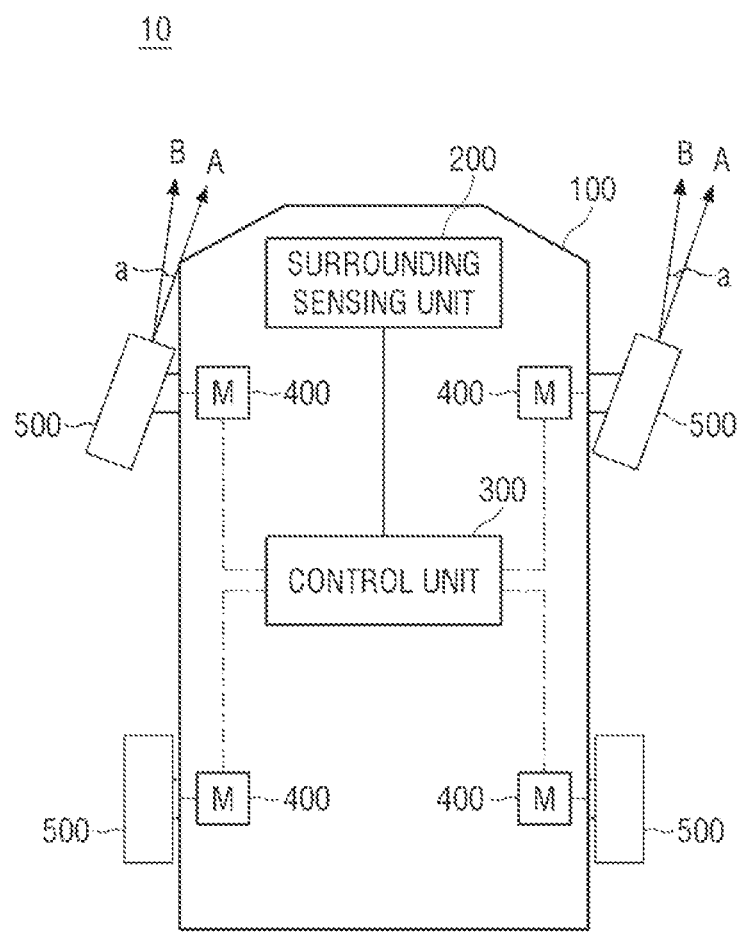
FIG. 4 is a diagram for explaining a slip rate of the body.
Figure 5:
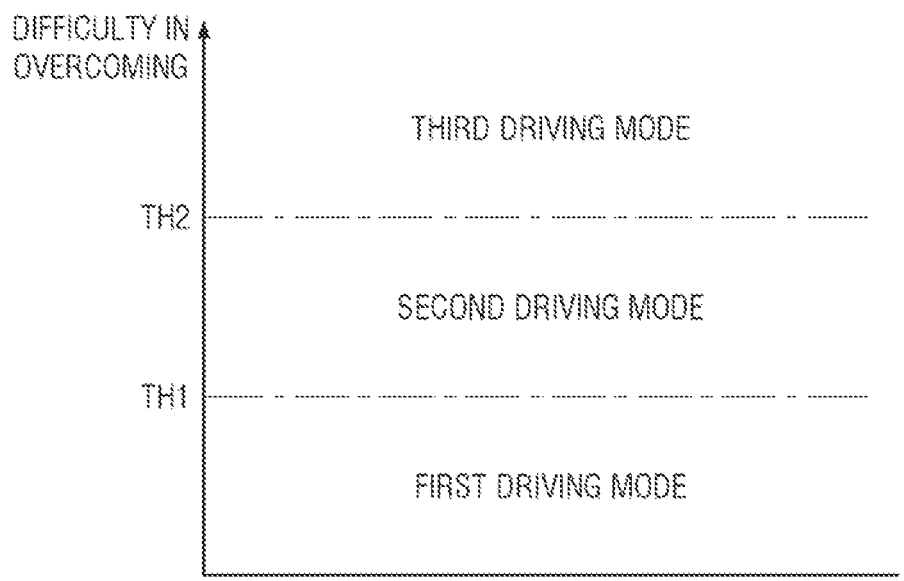
FIG. 5 is a diagram for explaining a driving mode with respect to a threshold.

FIG. 3 is a diagram for explaining the operation of the control unit, FIG. 4 is a diagram for explaining a slip rate of the body, and FIG. 5 is a diagram for explaining a driving mode with respect to a threshold.

Referring to FIG. 3, the control unit 300 may determine a driving mode of the body 100 with reference to the vision information, vibration, ambient sound, a slip rate, prior travel information, weather, and time.

The control unit 300 may determine the driving mode of the body 100 with reference to at least one from among the vision information, vibration, ambient sound, prior travel information, weather, and time.

Here, the vision information is information on the surroundings and travel route of the body 100 generated by the vision information generating unit 210, the vibration is the vibration of the body 100 sensed by the vibration sensing unit 220, and the ambient sound is ambient sound of the body 100 sensed by the ambient sound sensing unit 230.

The slip rate represents a difference between a controlled driving direction and an actual driving direction of the body 100. Referring to FIG. 4, when the controlled driving direction is direction A, the control unit 300 may control the travel driving unit 500 to travel in direction A. Meanwhile, the actual driving direction of the body 100 may be determined to be direction B, rather than direction A, due to external factors. For example, when a travel-obstruction element, such as ice on a road surface, is present, the body 100 may travel in direction B while the travel driving unit 500 slides on the road.

The control unit 300 may determine the road surface condition of the travel route with reference to the slip rate a, which is a difference between direction A and direction B, and determine the driving mode of the body 100.

The control unit 300 may determine the driving mode of the body 100 by referring to the vision information for the forward direction of a short-distance or long-distance travel route of the body 100 and may determine the driving mode of the body by referring to at least one from among the vision information, vibration, ambient sound, and slip rate for the current position of the body 100. For example, the control unit 300 may determine the driving mode of the body 100 by preferentially referring to the vision information for the forward direction of the travel route while the body 100 is traveling. In addition, when the body 100 enters the point where the vision information is referred to, the control unit 300 may determine the driving mode of the body 100 by additionally referring to the vibration, ambient sound, and slip rate.

The prior travel information is information that is obtained in advance with respect to the travel route currently being traveled. The control unit 300 may continuously determine the road surface condition when the driving apparatus 10 travels along the travel route. For example, while the driving apparatus 10 is traveling from an origin to a destination, the control unit 300 may determine the road surface condition of the entire route or the road surface condition of some sections spaced at regular intervals, and may store the determined road surface condition as the prior travel information. In addition, when the driving apparatus 10 travels in the corresponding travel route later, the control unit 300 may determine the road surface condition of the travel route with reference to the prior travel information.

For example, when information (hereinafter referred to as "real-time travel information") other than the prior travel information, such as vision information, vibration, ambient sound, etc., is not acquired, the control unit 300 may determine the driving mode of the body 100 by preferentially referring to the prior travel information. Also, when the real-time travel information is acquired during travel, the control unit 300 may maintain or change the driving mode with reference to the real-time travel information and the prior travel information.

The control unit 300 may update the prior travel information through learning, and determine the road surface condition of the travel route by referring to the updated prior travel information. The driving apparatus 10 may travel on the same travel route multiple times. Each time the travel route is traveled, the control unit 300 may determine and learn the road surface condition at the traveling time point and update the prior travel information based on the road surface condition. For example, the control unit 300 may calculate a trend of increasing or decreasing the slip rate a at a specific point on the travel route, and may predict the road surface condition in consideration of the trend when traveling at the corresponding point later.

The control unit 300 may determine the road surface condition of the travel route by referring to at least one from among weather and time during travel of the body 100. The control unit 300 may determine the road surface condition of the travel route by referring to weather information received through a separate communication means (not shown) or by referring to weather information sensed by a weather sensing means (e.g., a weather detection sensor) (not shown) provided in the body 100. For example, when it rains or snows or the temperature is below zero, the control unit 300 may predict an increase in the slip rate a.

The control unit 300 may determine the road surface condition of the travel route by referring to time during travel. The road surface condition may change over a day. The road surface condition in the early morning may differ from the road surface condition in the afternoon. The control unit 300 may be able to determine the road surface condition of the travel route to which the characteristics at a specific point in time in a day are reflected.

In addition, in embodiments of the present disclosure, time may include a date. For example, in embodiments of the present disclosure, the time may include month, day, hour, minute, and second. Accordingly, the control unit 300 may determine the road surface condition of the travel route to which the characteristics according to a current season and a specific point in time in a day are reflected.

The road surface condition determined according to weather and time may be used to update the prior travel information. The control unit 300 may update the prior travel information by reflecting the road surface condition for each weather condition and the hourly road surface condition thereto. When the driving apparatus 10 travels later on the corresponding travel route in similar weather and at similar time, the control unit 300 may determine the road surface condition to be one recorded in the prior travel information and determine the driving mode.

The control unit 300 may determine the road surface condition of the travel route and determine the driving mode of the body 100 according to the determination result. Specifically, the control unit 300 may determine the driving mode based on difficulty in overcoming the travel-obstruction element present on the travel route. It may be understood that the higher the difficulty, the more difficult it is to overcome the travel-obstruction element. For example, as the size of the gravel spread on the travel route and the area over which the gravel is spread increases, the difficulty of overcoming may be set to be higher, and as the size of the gravel and the area over which the gravel is spread are reduced, the difficulty of overcoming may be set to be lower. According to embodiments, the difficulty of overcoming may be represented as a value that is compared to one or more preset thresholds to determine the driving mode.

Referring to FIG. 5, in embodiments of the present disclosure, the driving mode may include a first driving mode, a second driving mode, and a third driving mode.

The first driving mode represents a mode in which the difficulty in overcoming a travel-obstruction element present on the travel route is less than a preset first threshold TH1. When there is no travel-obstruction element or there is a negligible travel-obstruction element on the travel route, the control unit 300 may determine the driving mode to be the first driving mode.

The second driving mode represents a mode in which the difficulty in overcoming a travel-obstruction element present on the travel route is greater than or equal to the preset first threshold TH1 and less than a preset second threshold TH2. When a travel-obstruction element is present on the travel route but can be overcome, the control unit 300 may determine the driving mode to be the second driving mode.

The third driving mode represents a mode in which the difficulty in overcoming a travel-obstruction element present on the travel route is greater than or equal to the preset second threshold TH2. When a travel-obstruction element is present on the travel route and it is very difficult to overcome, the control unit 300 may determine the driving mode to be the third driving mode.

In embodiments of the present disclosure, overcoming the travel-obstruction element may mean passing through the corresponding region without avoiding the travel-obstruction element. For example, in the case where ice as the travel-obstruction element is present on the travel route, if the body 100 moves along an upper surface of the ice, it may be regarded as overcoming the travel-obstruction element, and if the body 100 moves at a specific distance from the ice, it may be regarded as avoiding the travel-obstruction element.

Figure 6:
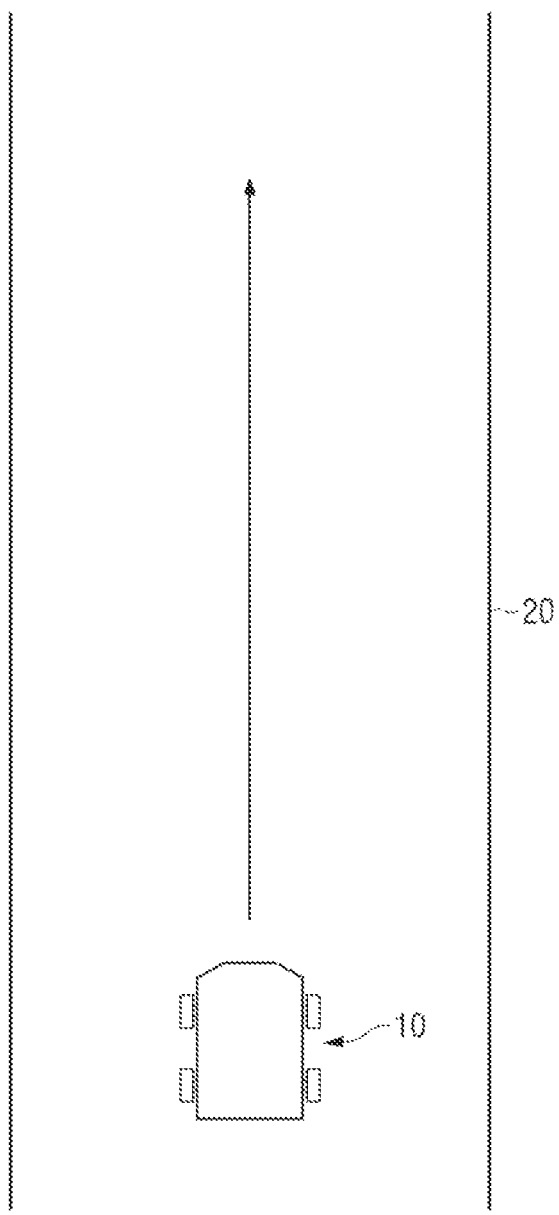
FIG. 6 is a diagram illustrating the driving apparatus traveling in a first driving mode.
Figure 7:
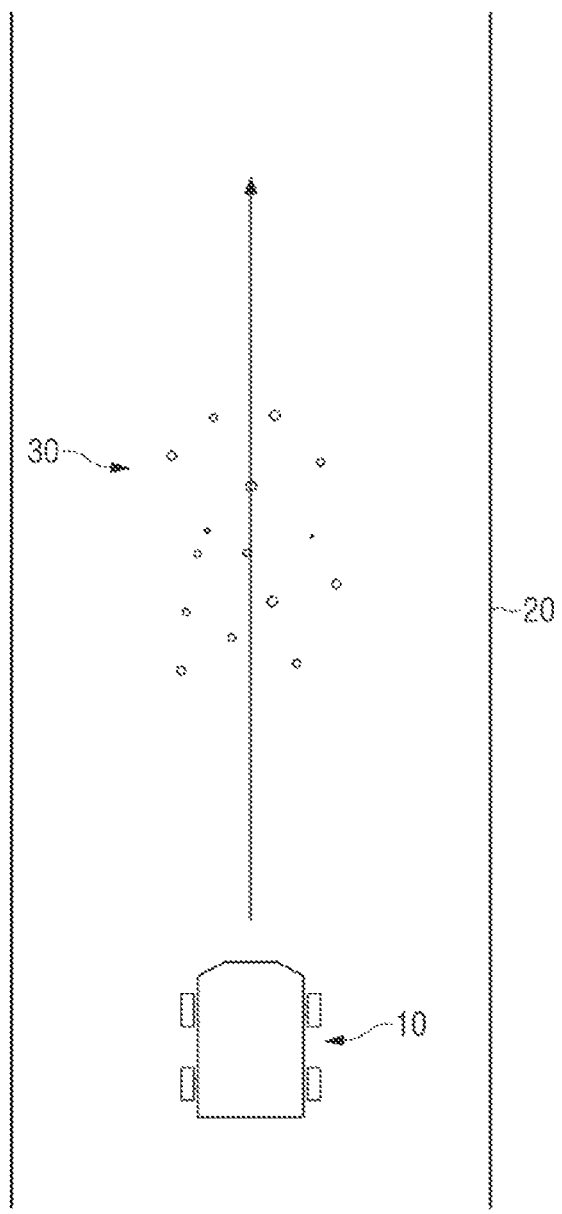
FIG. 7 is a diagram illustrating the driving apparatus traveling in a second driving mode.
Figure 8:
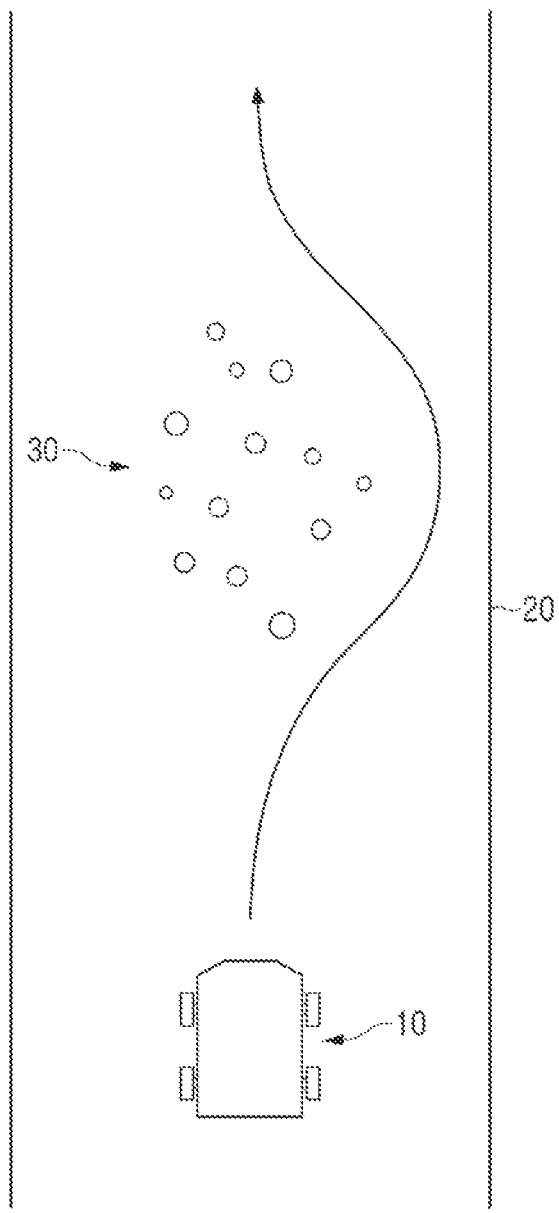
FIG. 8 is a diagram illustrating the driving apparatus traveling in a third driving mode.
Figure 9:
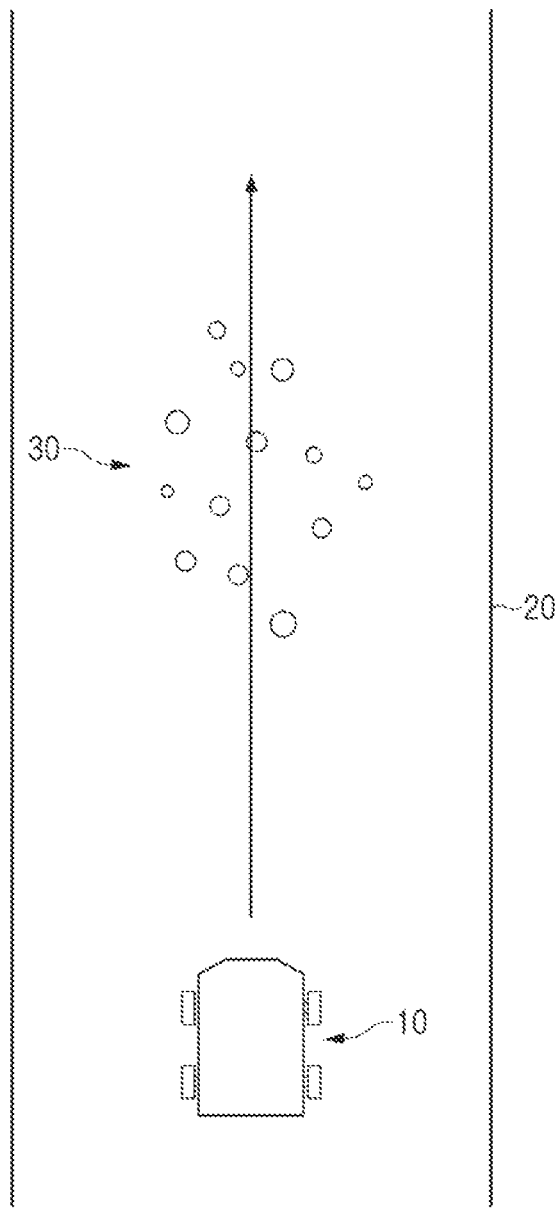
FIG. 9 is a diagram illustrating the driving apparatus traveling when a condition for remaining on a route is satisfied.

FIG. 6 is a diagram illustrating the driving apparatus traveling in the first driving mode, FIG. 7 is a diagram illustrating the driving apparatus traveling in the second driving mode, FIG. 8 is a diagram illustrating the driving apparatus traveling in the third driving mode, and FIG. 9 is a diagram illustrating the driving apparatus traveling when a condition for remaining on a route is satisfied.

Referring to FIGS. 6 to 8, the control unit 300 may control the body 100 to travel according to the driving mode.

Referring to FIG. 6, when the driving mode is determined to be the first driving mode, the control unit 300 may determine that no travel-obstruction element is present on the travel route 20 and control the body 100 to travel.

The first driving mode is a mode when there is no travel-obstruction element or there are only negligible travel-obstruction elements on the travel route 20. In this case, the control unit 300 may control the body 100 to travel without taking into account the travel-obstruction elements. For example, the control unit 300 may control the body 100 to travel while avoiding obstacles by taking into account only the sensing result of the vision information generating unit 210.

Referring to FIG. 7, when the driving mode is determined to be the second driving mode, the control unit 300 may control the body 100 to travel slow to overcome a travel-obstruction element 30.

The second driving mode is a mode when at least one travel-obstruction element 30 is present on the travel route 20 but can be overcome. In this case, the control unit 300 may control the body 100 to overcome the at least one travel-obstruction element 30 without avoiding it. However, the body 100 may travel at reduced speed in order to prevent damage to the body 100 and other loaded equipment.

The driving speed in the second driving mode may be determined according to the difficulty in overcoming the travel-obstruction elements. For example, the control unit 300 may increase the driving speed, the lower the difficulty of overcoming, and may reduce the driving speed, the higher the difficulty of overcoming. Alternatively, according to some embodiments of the present disclosure, in the second driving mode, the control unit 300 may control the body 100 to travel at a preset speed.

Referring to FIG. 8, when the driving mode is determined to be the third driving mode, the control unit 300 may control the body 100 to travel to avoid at least one travel-obstruction element 30.

The third driving mode is a mode when the at least travel-obstruction element 30 is very difficult to overcome is present on the travel route 20. For example, if the body 100 attempts to overcome a very large stone or gravel present on the travel route 20, the body 100 or other equipment may be damaged.

In the third driving mode, the control unit 300 may control the body 100 to travel to avoid the at least one travel-obstruction element 30. By avoiding the at least one travel-obstruction element 30, damage to the body 100 and other equipment can be prevented.

FIG. 8 is a diagram illustrating the driving apparatus 10 avoiding the at least one travel-obstruction element 30 by moving along a narrow route on which travel-obstruction elements are not present on the travel route. However, this is merely illustrative, and according to some embodiments of the present disclosure, the control unit 300 may control the driving apparatus 10 to avoid the at least one travel-obstruction element 30 by detouring to another travel route (not shown) other than the current travel route 20. To this end, the control unit 300 may use a device containing information on a route, such as a navigation device (not shown), and a global positioning system (GPS) receiver (not shown) that provides a current location.

When the driving mode is determined to be the first driving mode or the third driving mode, the control unit 300 may control the driving speeds of the plurality of the travel driving unit 500 to be individually set. For example, when the body 100 is traveling forward and turns to the left, the control unit 300 may control the plurality of the driving unit 400 such that the driving speeds of each of the plurality of the travel driving unit 500 provided on the right side of the body 100 are the same compared to the driving speeds of each of the plurality of the travel driving unit 500 provided on the left side of the body 100. Accordingly, when the body 100 travels along a curved route in the first driving mode or the third driving mode, the body 100 may be prevented from being pushed outward of the curved route.

Meanwhile, when the driving mode is determined to be the second driving mode, the control unit 300 may control the driving speeds of each of the plurality of travel driving unit 500 to be set the same. In other words, each of the plurality of the travel driving unit 500 provided in the body 100 operate at the same driving speed to enable the body 100 to travel. When the plurality of the travel driving unit 500 operate at different driving speeds in a state where there are travel-obstruction elements, such as stones, gravel, or ice, are present, it may be difficult to overcome the travel-obstruction elements.

When the driving speeds of the plurality of the travel driving unit 500 are set to be different in a state where the shapes of travel-obstruction elements are not clear, a driving force cannot be uniformly distributed over an entirety of the body 100, so that the posture of the body 100 may be unstable or the body 100 may deviate from the route. As the driving speeds of each of the plurality of the travel driving unit 500 provided in the body 100 are set to be the same while the body 100 is traveling at low speed, posture maintenance and route keeping of the body 100 can be implemented and the travel-obstruction elements can be overcome.

The traveling control by the control unit 300 during normal travel of the driving apparatus 10 has been described above. In an emergency, the control unit 300 may control the body 100 to travel in a different way in some driving modes.

Referring to FIG. 9, when the driving mode is determined to be the second mode and a preset condition for remaining on a route is satisfied, the control unit 300 may control the body 100 to travel to overcome at least one travel-obstruction element 30.

Here, the preset condition for remaining on a route may include at least one from among detection of an attack from an enemy or emergency movement. For example, even when the driving mode is determined to be the second driving mode, if an attack from an enemy is detected, the control unit 300 may control the body 100 to travel to overcome the at least one travel-obstruction element 30 without reducing a speed. This is because damage by the attack from the enemy may be more significant than damage by the at least one travel-obstruction element 30.

In addition, when the driving mode is determined to be the third driving mode and the condition for remaining on the route is satisfied, the control unit 300 may control the body 100 to travel to overcome the at least one travel-obstruction element 30 without changing the route. For example, when an enemy's equipment moves toward a route for avoiding the at least one travel-obstruction element 30, the control unit 300 may control the body 100 to travel to overcome the at least one travel-obstruction element 30 rather than avoiding it. In this case, the control unit 300 may maintain or reduce the driving speed of the body 100.

Figure 10:
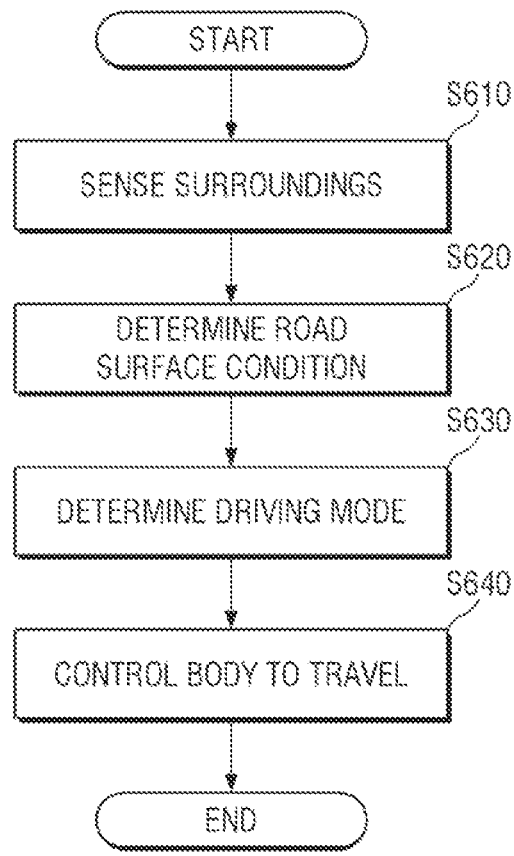
FIG. 10 is a flowchart illustrating a driving control method according to an embodiment of the present disclosure.

FIG. 10 is a flowchart illustrating a driving control method according to an embodiment of the present disclosure.

Referring to FIG. 10, a control unit 300 may control a body 100 to travel by referring to a sensing result of a surrounding sensing unit 200.

First, the surrounding sensing unit 200 may sense the surroundings of the body 100 in S610. The surrounding sensing unit 200 may generate vision information regarding a travel route 20 of the body 100 using a vision information generating unit 210, or may sense the surroundings of the body 100 by using an ambient sound sensing unit, and/or by sensing vibration of the body 100 by using a vibration sensing unit 220.

In addition, the control unit 300 may determine a road surface condition of the travel route 20 with reference to at least one from among the vision information, vibration, ambient sound, prior travel information, weather, and time in S620. The road surface condition may be calculated as a difficulty in overcoming at least one travel-obstruction element 30.

The control unit 300 may continuously update the prior travel information while determining the road surface condition. The control unit 300 may determine the road surface condition of the travel route 20 and update the prior travel information by reflecting the result of learning at least one from among the currently collected vision information, vibration, ambient sound, slip rate, weather, and time. As the control unit 300 updates the prior travel information, the difficulty in overcoming the travel-obstruction elements for each situation or for each point may be updated and the preset first threshold TH1 and the preset second threshold TH2 described above may be updated. Accordingly, as the prior travel information is repeatedly updated, the reliability of the driving mode determined according to the road surface condition may be improved.

When the road surface condition has been determined, the control unit 300 may determine a driving mode of the body 100 in S630. The driving mode may be determined to be a first driving mode, a second driving mode, or a third driving mode according to the difficulty in overcoming the travel-obstruction elements.

When the driving mode is determined, the control unit 300 may control the body 100 to travel in the determined driving mode in S640. In the first driving mode, the control unit 300 may regard that the at least one travel-obstruction element 30 is not present and may control the body 100 to travel. In the second driving mode, the control unit 300 may control the body 100 to travel at low speed to overcome the at least one travel-obstruction element 30. In the third driving mode, the control unit 300 may control the body 100 to travel to avoid the at least one travel-obstruction element 30.

In this case, when the driving mode is determined to be the first driving mode or the third driving mode, the control unit 300 may control driving speeds of a plurality of the travel driving unit 500 to be individually set. When the driving mode is determined to be the second driving mode, the control unit 300 may control the driving speeds of the plurality of the travel driving unit 500 to be set the same.

Meanwhile, when a condition for remaining on a route, such as an attack from an enemy or emergency movement, is satisfied, the control unit 300 may control the body 100 to travel to overcome the at least one travel-obstruction element 30 without reducing speed in the second driving mode, and may control the body 100 to travel to overcome the at least one travel-obstruction element 30 without changing the route in the third driving mode.

Figure 11:
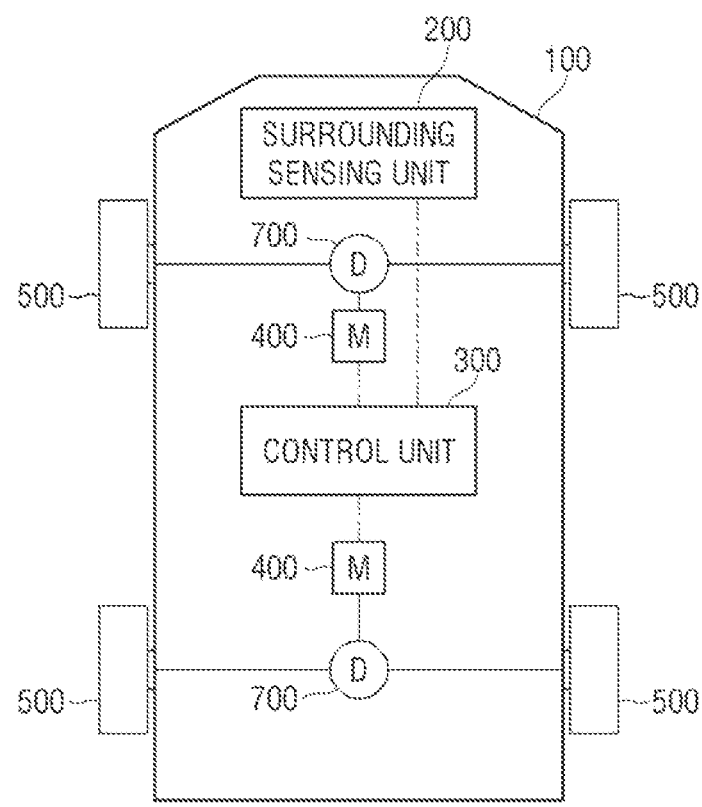
FIG. 11 is a diagram illustrating a driving apparatus according to another embodiment of the present disclosure.

FIG. 11 is a diagram illustrating a driving apparatus according to another embodiment of the present disclosure.

Referring to FIG. 11, a driving apparatus 11 according to another embodiment of the present disclosure includes a body 100, a surrounding sensing unit 200, a control unit 300, a driving unit 400, a travel driving unit 500, and a power transmission unit 700 (also referred to as a "power transmission").

Since the body 100, the surrounding sensing unit 200, the control unit 300, the driving unit 400, and the travel driving unit 500 have been described above, the differences from the present embodiment will be mainly described below.

The power transmission unit 700 may serve to transmit a driving force of the driving unit 400 to the travel driving unit 500. Specifically, the power transmission unit 700 may transmit the driving force of a single driving unit 400 to two of the travel driving unit 500 disposed on the left and right sides of the body 100, respectively. For example, the power transmission unit 700 may be provided in the form of a differential gear.

FIG. 11 illustrates that the driving apparatus 11 includes the driving unit 400 and the power transmission unit 700 for the travel driving unit 500 located in the front, together with the driving unit 400 and the power transmission unit 700 for the travel driving unit 500 located at the rear. However, this is merely illustrative, and according to some embodiments of the present disclosure, the driving apparatus 11 may include the driving unit 400 and the power transmission unit 700 only for the travel driving unit 500 located in the front or include the driving unit 400 and the power transmission unit 700 only for the travel driving unit 500 located at the rear. Hereinafter, description will be given of an example in which the driving unit 400 and the power transmission unit 700 are provided on both the front and rear sides of the body 100.

The power transmission unit 700 may distribute the driving force of the driving unit 400 to the travel driving unit 500 at the left side of the body 100 and the travel driving unit 500 at the right side of the body 100. The driving force of the driving unit 400 may be distributed by the power transmission unit 700 and transmitted to the travel driving unit 500 at the left side of the body 100 and the travel driving unit 500 at the right side of the body 100.

The power transmission unit 700 may determine whether to distribute the power under the control of the control unit 300. For example, the power transmission unit 700 may allow the same driving force or different driving forces to be transmitted to the travel driving unit 500 at the left side of the body 100 and the travel driving unit 500 at the right side of the body 100 under the control of the control unit 300.

In embodiments of the present disclosure, when the driving mode is determined to be the first driving mode or the third driving mode, the control unit 300 may control the driving speeds of the plurality of the travel driving unit 500 to be individually set, and when the driving mode is determined to be the second driving mode, may control the driving speed of the plurality of the travel driving unit 500 to be set the same. To this end, when the driving mode is determined to be the first driving mode or the third driving mode, the power transmission unit 700 may appropriately distribute the driving force of the driving unit 400 and transmit the distributed driving force to the travel driving unit 500 at the left side of the body 100 and the travel driving unit 500 at the right side of the body 100, that are connected to the power transmission unit 700. Meanwhile, when the driving mode is set to be the second driving mode, the power transmission unit 700 may equally distribute the driving force of the driving unit 400 and transmit the distributed driving force to the travel driving unit 500 at the left side of the body 100 and the travel driving unit 500 at the right side of the body 100, that are connected to the power transmission unit 700.

When the driving mode is the second driving mode, the control unit 300 may control the plurality of the driving unit 400 located at the front and rear sides of the body 100 to generate the same driving force. The plurality of the driving unit 400 located at the front and rear sides of the body 100 generate the same driving force and the plurality of the power transmission unit 700 connected to the respective ones of the plurality of the driving unit 400 equally distribute the driving force and transmit the distributed driving force to the plurality of the travel driving unit 500 on left and right sides, so that the driving speeds of each of the plurality of the travel driving unit 500 may be set to be equal to one another.

As described above, even when the number of the driving unit 400 is less than the number of the travel driving unit 500, it is possible to adjust a difference in driving speed between the plurality of the travel driving unit 500 through at least one power transmission unit 700.

According to embodiments, the control unit 300 may comprise at least one processor and memory storing computer instructions. The at least one processor may include or may be a central processing unit (CPU), an application processor, a modem-integrated application processor, a system-on-chip (SoC), an integrated circuit, or the like. The computer instructions, when executed by the at least one processor, may be configured to cause the control unit 300 to perform its special purpose functions described above in the present disclosure and/or other functions.

According to embodiments of the driving apparatus and the driving control method as described above, the driving mode and the travel route are reset according to the road surface condition, and thus damage to equipment loaded on a vehicle and a vehicle body can be prevented.

What is claimed:
1. A driving apparatus comprising:
a vehicle body;
a plurality of vehicle propulsion bodies connected to the vehicle body and configured to enable the vehicle body to travel;
at least one sensor configured to sense surroundings of the vehicle body; and
a controller configured to control the vehicle body to travel by referring to at least one sensing result of the at least one sensor,
wherein the at least one sensor comprises a vision generation sensor configured to generate vision information regarding a travel route of the vehicle body,
wherein the controller is further configured to determine a road surface condition of the travel route by referring to the vision information, and adjust a difference in driving speed between the plurality of vehicle propulsion bodies according to the road surface condition, and
wherein the controller is further configured to determine a driving mode of the vehicle body according to the road surface condition of the travel route, wherein the controller is configured to determine the driving mode as:
a first driving mode based on a difficulty in overcoming a travel-obstruction element present on the travel route being less than a preset first threshold;
a second driving mode based on the difficulty in overcoming the travel-obstruction element present on the travel route being greater than or equal to the preset first threshold and less than a preset second threshold; and
a third driving mode based on the difficulty in overcoming the travel-obstruction element present on the travel route being greater than or equal to the preset second threshold.

2. The driving apparatus of claim 1, wherein the controller is configured to determine the road surface condition of the travel route by referring to at least one from among vibration of the vehicle body and ambient sound generated around the vehicle body.

3. The driving apparatus of claim 1, wherein the controller is further configured to determine the road surface condition of the travel route by referring to a slip rate that is a difference between a controlled driving direction of the vehicle body and an actual driving direction of the vehicle body.

4. The driving apparatus of claim 1, wherein the controller is further configured to determine the road surface condition of the travel route by referring to at least one from among weather and time during travel of the vehicle body.

5. The driving apparatus of claim 1, wherein the controller is further configured to determine the road surface condition of the travel route by referring to prior travel information.

6. The driving apparatus of claim 5, wherein the controller is further configured to update the prior travel information through learning, and determine the road surface condition of the travel route by referring to the updated prior travel information.

7. The driving apparatus of claim 1, wherein the controller is further configured to:
based on the driving mode being determined to be the first driving mode or the third driving mode, control driving speeds of the plurality of vehicle propulsion bodies to be individually set, and
based on the driving mode being determined to be the second driving mode, control the driving speeds of the plurality of vehicle propulsion bodies to be set the same as each other.

8. The driving apparatus of claim 1, wherein the controller is further configured to:
based on the driving mode being determined to be the first driving mode or the second driving mode, control the vehicle body to travel to overcome the travel-obstruction element; and
based on the driving mode being determined to be the third driving mode, control the vehicle body to travel to avoid the travel-obstruction element.

9. The driving apparatus of claim 1, wherein the controller is further configured to:
based on the driving mode being determined to be the second driving mode and a preset condition for remaining on a route being satisfied, control the vehicle body to travel to overcome a travel-obstruction element; and
based on the driving mode being determined to be the third driving mode and the preset condition for remaining on the route being satisfied, control the vehicle body to travel to overcome the travel-obstruction element, instead of avoiding the travel-obstruction element.

10. A driving control method of controlling a driving apparatus to travel, the driving control method performed by at least one processor and comprising:
obtaining, at least one sensing result by sensing, with at least one sensor, surroundings of a vehicle body of the driving apparatus; and
controlling the vehicle body to travel by referring to the at least one sensing result,
wherein the sensing of the surroundings of the vehicle body comprises generating vision information regarding a travel route of the vehicle body,
wherein the controlling of the vehicle body to travel comprises determining a road surface condition of the travel route by referring to the vision information, and adjusting a difference in driving speed between a plurality of vehicle propulsion bodies, of the driving apparatus, according to the road surface condition, and
wherein the controlling of the vehicle body to travel further comprises determining a driving mode of the vehicle body, from among a first driving mode, a second driving mode, and a third driving mode, according to the road surface condition of the travel route, wherein the driving mode is determined as:
the first driving mode based on a difficulty in overcoming a travel-obstruction element present on the travel route being less than a preset first threshold;
the second driving mode based on the difficulty in overcoming the travel-obstruction element present on the travel route being greater than or equal to the preset first threshold and less than a preset second threshold; or
the third driving mode based on the difficulty in overcoming the travel-obstruction element present on the travel route being greater than or equal to the preset second threshold.

11. The driving control method of claim 10, wherein the determining comprises determining the road surface condition of the travel route by referring to at least one from among vibration of the vehicle body and ambient sound generated around the vehicle body.

12. The driving control method of claim 10, wherein the determining comprises determining the road surface condition of the travel route by referring to a slip rate that is a difference between a controlled driving direction of the vehicle body and an actual driving direction of the vehicle body.

13. The driving control method of claim 10, wherein the determining comprises determining the road surface condition of the travel route by referring to at least one from among weather and time during travel of the vehicle body.

14. The driving control method of claim 10, wherein the determining comprises determining the road surface condition of the travel route by referring to prior travel information.

15. The driving control method of claim 14, wherein the controlling of the vehicle body to travel further comprises updating the prior travel information through learning, and
wherein the determining comprises determining the road surface condition of the travel route by referring to the updated prior travel information.

16. The driving control method of claim 10, wherein the controlling of the vehicle body to travel further comprises: based on the driving mode being determined to be the first driving mode or the third driving mode, controlling driving speeds of the plurality of vehicle propulsion bodies to be individually set; or based on the driving mode being determined to be the second driving mode, controlling the driving speeds of the plurality of vehicle propulsion bodies to be set the same as each other.

17. The driving control method of claim 10, wherein the controlling of the vehicle body to travel further comprises: based on the driving mode being determined to be the first driving mode or the second driving mode, controlling the vehicle body to travel to overcome a travel-obstruction element; or based on the driving mode being determined to be the third driving mode, controlling the vehicle body to travel to avoid the travel-obstruction element.

18. The driving control method of claim 10, wherein the controlling of the vehicle body to travel further comprises: based on the driving mode being determined to be the second driving mode and a preset condition for remaining on a route is satisfied, controlling the vehicle body to travel to overcome the travel-obstruction element; or based on the driving mode being determined to be the third driving mode and the preset condition for remaining on the route is satisfied, controlling the vehicle body to travel to overcome the travel-obstruction element, instead of avoiding the travel-obstruction element.

* * * * *